Figure 1:
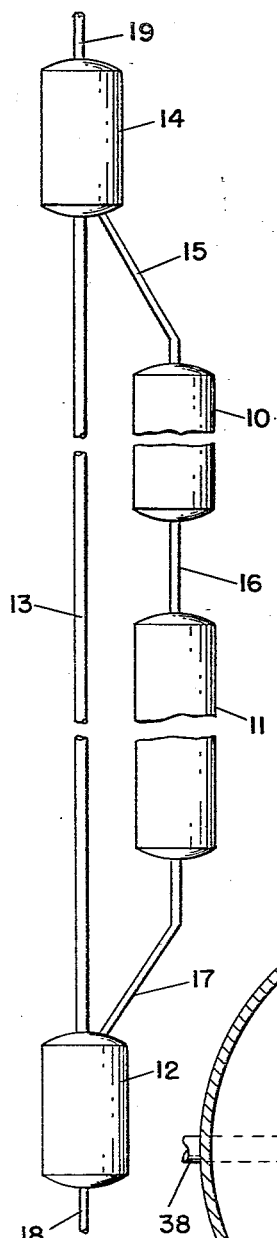

Oct. 16, 1956     W. C. HUFFMAN     2,767,031

ELEVATION OF GRANULAR SOLIDS

Filed Oct. 11, 1951

*INVENTOR.*
WALTER C. HUFFMAN

BY

*Busser and Smith*

ATTORNEYS 2,767,031
Patented Oct. 16, 1956

2,767,031

ELEVATION OF GRANULAR SOLIDS

Walter C. Huffman, Wallingford, Pa., assignor to Sun Oil Company, Philadelphia, Pa., a corporation of New Jersey Application October 11, 1951, Serial No. 250,929

8 Claims. (Cl. 302—59)

This invention relates to the elevation of granular solids by means of a lifting gas and more particularly to the separation of solids from gas after such elevation.

It is known in the art to elevate granular solids from a lower zone to a higher or disengaging zone by suspending the solids in a lifting gas under elevated pressure and passing the lifting gas, having solids suspended therein, upwardly through a confined zone from the lower zone to the disengaging zone. Upon discharge of the mixture of solids and gas into the disengaging zone, which is larger in cross section than the confined zone, the lifting gas expands laterally and therefore decreases in upward velocity. The granular solids thereupon also decrease in upward velocity until their upward velocity is zero and the solids then fall downwardly in the disengaging zone and are collected in the lower portion thereof for future use.

An important industrial application of gas lifting operations as previously described, is in the so-called moving bed process for the conversion of hydrocarbon material by contact with granular solid contact material. In such processes it is known to gravitate granular solids through a reaction zone or zones and therefrom to a low level in the system. The solids are then suspended in lifting gas and elevated to a disengaging zone in the bottom of which they are collected as a compact mass and gravitated again through the reaction zone.

In moving bed hydrocarbon conversion processes and in other industrial applications of gas lifting operations, the distances through which the solids must be elevated are frequently great and confined lifting zones or lift conduits through which the solids are elevated must therefore be vertically elongated; for example, such lift conduits frequently have vertical heights which are 50 to 300 times the major dimension of the average cross section of the lifting conduit. In order to elevate granular solids, particularly mixtures of granular solids which contain a substantial proportion of coarse granular solids, through an elongated confined zone, it is generally necessary to impart to the solids a high velocity so that the solids which are discharged from the lift conduit into the disengaging zone are traveling at a high velocity and therefore tend to rise through a relatively large distance above the outlet of the lift conduit before their upward velocity decreases to zero. As a result the solids fall through a relatively large distance, from the top of their height of rise above the lift conduit outlet to the lower level in the disengaging zone where their fall is abruptly arrested, for example, by striking the top of the compact mass of solids in the bottom of the disengaging zone. Frequently in industrial applications the granular solids which are to be elevated are subject to substantial attrition upon having their fall from a substantial height abruptly arrested. Therefore, in prior art gas lifting operations a disadvantageous effect has been obtained when solids have risen to a relatively great distance above the top of the lift conduit before falling downwardly into the bottom of the disengaging zone. The attrition which results under such conditions is disadvantageous in that it results in a high rate of loss of granular solids from the process system.

According to the present invention granular solids discharged from a lift conduit outlet at high velocity into a disengaging zone are more rapidly decelerated than in prior art operation. This is accomplished according to the present invention by a combined operation wherein a braking gas is discharged downwardly into the stream of gas and solids which rises through the lift conduit therefrom into the disengaging zone. The effect of the braking gas is partly to oppose the upward motion of the granular solids in the rising stream thereby to decelerate the granular solids, and partly to laterally divert the rising of gas and solids away from the longitudinal axis of the lift conduit and of the braking gas stream. The deflection of the rising stream in a lateral direction is aided by the use of a baffle, concentric with the longitudinal axis of the lift conduit and of the braking gas stream, and tapering gradually downwardly so that the lifting gas stream as it rises is forced to move laterally by the gradually upwardly increasing lateral extension of the baffle. The angle with the vertical at which the rising stream is deflected can be substantially constant at a relatively lower level in the height of rise of the gas and solids but during the passage of the rising stream through a higher level the angle of deflection from the vertical gradually increases until the gas and solids are traveling in a substantially horizontal direction. At this point the gas and solids are underneath a transverse portion of the baffle which portion prevents the gas and solids from rising any higher in the disengaging zone. After reaching this point the gas and solids are deflected downwardly, the angle of deflection from the horizontal gradually increasing.

The operation according to the present invention obtains its advantageous effects by a combination of the use of a braking gas stream to oppose the rising solids and of the use of a transverse baffle to prevent the solids and gas from rising above the level of the under surface of the baffle. This combination of features provides a particularly advantageous operation since the braking gas which is introduced into the rising stream of lifting gas and solids, is trapped between the transverse baffle and the main bulk of the rising solids and this braking gas acts as a cushion between the solids and the surface of the baffle and prevents excessive impingement of the solids on the surface of the baffle. Thus, by use of the braking gas in combination with the baffle, it is possible to have the baffle situated at a relatively low level in the disengager, thus providing an operation with a relatively small height of rise while still providing an operation wherein there is no excessive impingement of granular solids on the surface of the baffle. By decreasing the height of rise of the solids, the distance through which they fall before having their fall abruptly arrested is minimized and the attrition undergone by the solids upon having their fall abruptly arrested is also thereby minimized. Since no excessive impingement of solids on the surface of the baffle occurs, no substantial attrition of solids is added to the total attrition by the use of the baffle.

In operation according to the present invention the operating conditions and the positioning of the transverse baffle are so chosen that the granular solids would, in the absence of the transverse baffle, but with braking gas being introduced into the rising stream of gas and solids, rise to a level somewhat above the level of the under surface of the transverse baffle. In this manner the transverse baffle provides a further depression of the height of rise beyond that which would be obtained with the use of braking gas alone. However, the difference between the heights of rise obtained with and without the transverse baffle should not be so great that with the transverse baffle in place excessive impingement of granular solids on the surface of the baffle would occur in spite of the cushioning effect of the braking gas. Generally it is preferred that the operating conditions and the positioning of the transverse baffle should be such that the difference in the heights of rise with and without the baffle is not greater than three times the major dimension of the average cross section of the lift conduit.

Figure 2:
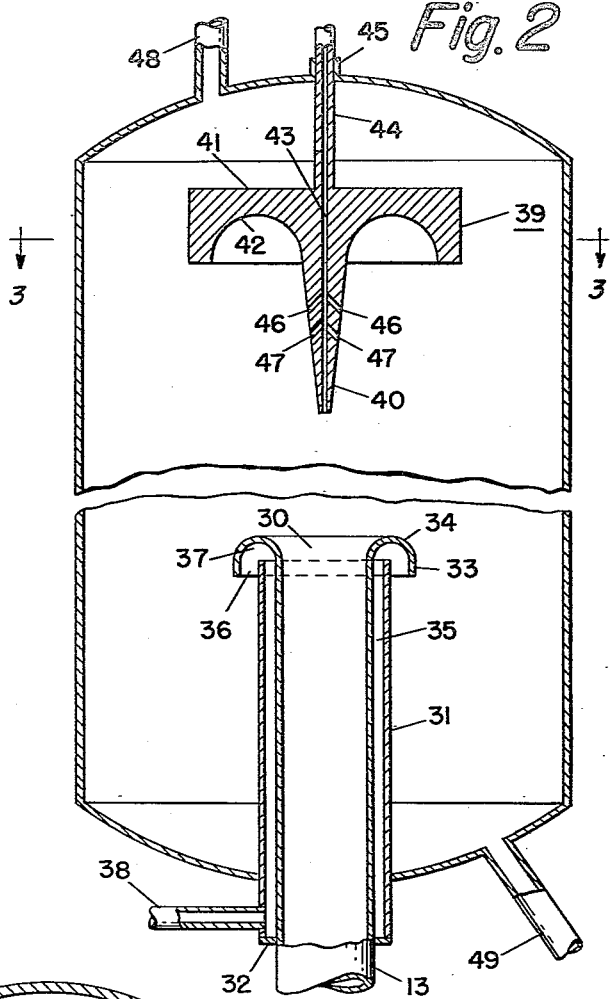
Figure 3:
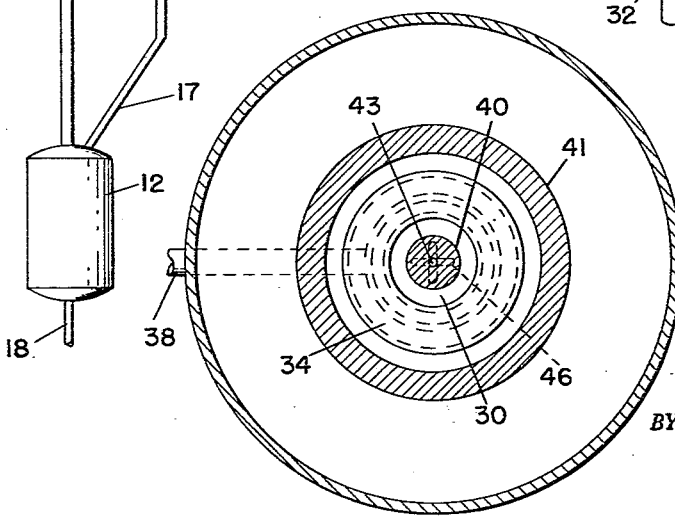

The invention will be further described with reference to the attached drawing. Figure 1 is a schematic diagram illustrating a system of apparatus adapted for the circulation of granular solids therethrough with elevation of the solids by means of a lifting gas from a low level in the system to a higher level therein. Figure 1 does not show any details according to the present invention and is provided merely to illustrate a system of apparatus to which the invention can advantageously be applied. Figure 2 is a sectional elevational view of a disengaging vessel which can be used in a system of apparatus of the type shown in Figure 1 in order to provide the advantages of the present invention. Figure 3 is a sectional plan view of the disengager shown in Figure 2. Figures 2 and 3 illustrate details according to the present invention.

Turning now to Figure 1, there are shown therein reaction vessels 10 and 11, gas lift engaging vessel 12, lift conduit 13 and gas lift disengaging vessel 14. In operation granular solids are gravitated as a contact mass from the bottom of disengager 14 through line 15 into reaction vessel 10 which can be, for example, a hydrocarbon conversion reactor. From vessel 10 the solids are gravitated through line 16 into reaction vessel 11 which can be, for example, a regenerator for hydrocarbon conversion-supporting granular solids. From vessel 11 the solids are gravitated through line 17 into engager 12 wherein they are suspended in lifting gas introduced into the engager 12 through line 18. Lifting gas having solids suspended therein is passed from engager 12 upwardly through lift conduit 13 into disengager 14. Granular solids are collected in the bottom of disengager 14 and passed again through line 15 into reaction vessel 10. Lifting gas is removed from disengager 14 through line 19 substantially separately from the bulk of the granular solids. The removed lifting gas generally contains, however, some entrained fine particles which can be removed from the lifting gas by passing the latter through separating means such as a cyclone separator not shown.

Turning now to Figures 2 and 3 there is illustrated therein gas lift disengaging vessel 14 above and communicating with outlet 30 of lift conduit 13. Surrounding an upper portion of lift conduit 13 is a cylindrical sleeve 31 which extends downwardly through the bottom of disengager 14 and has its lower portion positioned exteriorly of disengager 14. A bottom plate 32 closes off the lower end of sleeve 31. Surrounding an upper portion of sleeve 31 is an outer sleeve 33 and secured to the top of sleeve 33 and to the top of lift conduit 13 is an upper ring conduit portion 34. The apparatus as above described provides an annular space 35 between sleeve 31 and lift conduit 13 and an annular space 36 between sleeve 31 and outer sleeve 33 and a connecting annular space 37 beneath the ring conduit portion 34. Communicating with a lower portion of annular space 35 is an external conduit 38.

Positioned within disengaging vessel 14 and directly above outlet 30 of lift conduit 13 is a transverse baffle 39. This baffle has a gradually downwardly tapered central portion 40 which is concentric with lift conduit 13 and also has an outer portion 41, the under surface 42 of which is smoothly curved from its junction with an upper part of the central portion 40 through a raised intermediate annular section to a lower outer annular section. Central portion 40 of baffle 39 has an aperture 43 therethrough concentric with lift conduit 13. Communicating with the upper end of the aperture 43 is braking gas conduit 44 which extends upwardly through the top of disengager 14 and through packing gland 45 and terminates exteriorly of disengager 14. Extending downwardly from aperture 43 are a plurality of inclined apertures 46 which have their lower outlets at the outer surface of the central portion 40 of baffle 39. A plurality of similar inclined apertures 47 are positioned at a lower level than the inclined apertures 46. Disengager 14 has at the top thereof an outlet 48 for lifting gas and braking gas and also has at the bottom thereof an outlet 49 for granular solids. The annular spaces 36, 37, and 35, together with external conduit 38, provide an auxiliary outlet for lifting gas and braking gas from disengager 14.

In operation lifting gas having granular solids suspended therein passes upwardly through lift conduit 13 and is discharged from outlet 30 thereof into disengager 14. At the same time braking gas is passed downwardly through conduit 44 into and through aperture 43 in baffle 39, and is discharged from the lower end of aperture 43 into the rising stream of gas and solids. Some of the braking gas which is introduced into aperture 43 passes through the inclined apertures 46 and 47 and is discharged from the lower ends thereof as inclined downwardly directed streams into the rising stream of gas and solids after the latter has been deflected laterally from the longitudinal axis of baffle 39 by the lower part of central portion 40 of baffle 39. The rising stream of gas and solids is increasingly deflected from the vertical as it follows the undersurface 42 of outer portion 41 of baffle 39. After it passes the highest portion of undersurface 42 the stream of gas and solids is gradually deflected downwardly as it continues to move laterally away from the longitudinal axis of baffle 39. The braking gas which is discharged through the outlets of aperture 43 and of inclined apertures 46 and 47, reverses its direction of vertical movement and passes upwardly with the lifting gas and solids adjacent to the surface of the baffle 39. In so doing the braking gas provides a cushion between the solids and under surface 42 of baffle 39 and aids in moving the solids smoothly along the under surface 42 of baffle 39 without excessive impingement of solids on the surface 42. When the gas and solids reach the lower end of the outermost portion of undersurface 42, the solids continue in their downward path and fall into a lower portion of disengager 14 and onto the top of the compact mass of solids in that lower portion. The lifting gas and braking gas can either continue in their downward path and be removed through the outlet provided by the annular spaces 36, 37, and 35 and the external conduit 38, or the lifting gas and braking gas can pass upwardly around and above the transverse baffle 39 and into the outlet 48 for removal from disengager 14.

The inclined apertures 46 and 47 illustrated in the drawing provide, in effect means for directing two, vertically spaced apart, inclined annular streams of braking gas downwardly into a rising stream of gas and solids. It is to be understood that one set of apertures, e. g. the apertures 46, can be used in the absence of the other set, e. g. the apertures 47. In fact, the present invention can be practiced in the absence of any inclined apertures such as the apertures 46 and 47, all braking gas being discharged through a central aperture such as the aperture 43. The inclined apertures are advantageously used, however, when it is necessary or desirable to provide additional cushioning air to prevent impingement of solids on baffle 39. Any other suitable arrangement for obtaining annular inclined streams of braking gas can be employed, e. g. apparatus such as is disclosed in copending application Serial No. 223,592, filed April 28, 1951, by Clarence H. Thayer, now Patent No. 2,753,221, issued July 3, 1956.

According to the invention, lifting gas and braking gas can be withdrawn from disengager 14 through outlet 48 or through the lower outlet provided by the annular passages 36, 37, and 35, or through both outlets. The advantage of providing the lower outlet resides in the fact that the removal of gas therethrough, under the influence of vacuum applied if desired through conduit 38, provides a low pressure area adjacent the lift conduit outlet. Lifting gas issuing from the lift conduit outlet tends to move toward this low pressure area and into the lower outlet, thus reducing the energy with which solids are propelled toward baffle 43 and facilitating the reversal of direction of solids without substantial impingement on the baffle.

The dimensions and positioning of baffle 43 vary according to the operating conditions which are employed. The following is presented as an example of suitable positioning under typical operating conditions:

A mixture of granular solids, a major proportion of which are large enough to be retained on a 20 mesh U. S. Sieve Series screen and substantially all of which are small enough to pass a 3 mesh screen, are suspended in lifting air and elevated through a cylindrical lift conduit 67 feet high and having 8 inch diameter. The solids and lifting gas are discharged into a disengager in which a transverse baffle is positioned concentric with the lift conduit. A 3/16 inch diameter vertical aperture to which braking gas is supplied runs through the center of the baffle and has an outlet at the lowest point of the baffle, 4 feet above the lift conduit outlet. The central portion of the baffle has three vertically spaced apart annular inclined braking gas outlets communicating with the 3/16 inch aperture at levels, about 5.5, 6.25, and 7 inches respectively above the lowest point of the baffle. Smoothly curved outer portions of the baffle provide reversal of direction of gas and solids, similarly to that provided by the baffle illustrated in the drawing, after the gas and solids pass the uppermost annular braking gas outlet. The highest point of the smoothly curved portion is about five feet above the lift conduit outlet.

The volume rate of lifting gas employed is about 1150 standard cubic feet per minute, providing a lifting gas velocity calculated from the lift conduit cross section, of about 55 feet per second. The velocity of the solids as they issue from the top of the lift conduit is about 30 feet per second, as calculated by the following equation:

$$U_s = U_g - 9.9 \sqrt{\frac{D_s d_s}{d_g}}$$

where $U_s$ is solids velocity in feet per second, $U_g$ is lifting gas velocity in feet per second, $D_s$ is average particle diameter of the solids in feet, and $d_s/d_g$ is the ratio of densities of the solids and of the lifting gas. The volume rate of braking gas employed is about 200 standard cubic feet per minute. The braking gas velocity at discharge from the braking gas outlets is about 480 feet per second.

Under the above conditions, with the apparatus employed, the height of rise of solids above the lift conduit outlet would be about 6.5 feet if the smoothly curved outer portions of the transverse baffle were not employed, i. e. if the solids were caused to reverse in direction merely through the effect of the braking gas and through subsequent decrease in upward velocity to zero through loss of momentum. Thus, by employing the smoothly curved portion of the baffle according to the invention, the height of rise is decreased another 1.5 feet.

Considerable variation from the conditions in the above example can be practiced. If higher lifting gas velocities or if lower braking gas velocities are employed, the transverse baffle should generally be positioned higher above the lift conduit outlet. If no annular inclined braking gas streams are employed, the transverse baffle should generally be positioned higher above the lift conduit outlet. In the light of the present specification a person skilled in the art can determine, for a given set of operating conditions, the proper positioning of apparatus.

The present invention is generally applicable to the elevation of granular solids which are subject to substantial attrition upon having their motion at relatively high velocity abruptly arrested. Examples of such solids are the widely used hydrocarbon conversion catalysts, e. g. natural or synthetic silica-alumina catalyst, and also inert refractory granular materials such as are used as heat transfer material in noncatalytic hydrocarbon conversion.

The invention is used in the elevation of mixtures of coarse granular solids, e. g. mixtures of solids a major proportion of which are large enough to be retained on a 20 mesh U. S. Sieve Series screen. Such mixtures are widely used in hydrocarbon conversion systems wherein a moving compact bed of solids gravitates through the conversion and regeneration vessels, whereas mixtures of more finely divided solids are employed in the so-called "fluid" type of hydrocarbon conversion operation. When employed in the elevation of mixtures of coarse granular solids, the present invention is particularly advantageous, since the momentum of the large particles traveling at high velocities is large and the problem of decelerating the particles is a more important one to be solved when the particles have such large momentum.

Any suitable lifting gas can be used according to the present invention. The lifting gas can be inert with respect to the solids elevated, as in the case of steam, air, or flue gas used to elevate regenerated hydrocarbon conversion supporting granular solids, or the lifting gas can be capable of undergoing a chemical reaction upon contact with the solids, as in the case of hydrocarbon vapors used to elevate regenerated, hydrocarbon conversion-supporting granular solids under conversion-supporting conditions. Any suitable braking gas can be used according to the present invention. The braking gas can be the same as, or different from the lifting gas.

The present invention is advantageously applied to lifting operations wherein granular solids are elevated through elongated confined lift conduits whose heights may be, for example, 50 to 300 times the major dimension of the cross section of the lift conduit. Lift conduits of such height are used, for example, in hydrocarbon conversion operations wherein granular particles of the conversion-supporting contact material are elevated from a low point in the conversion apparatus system to a high point therein. The lifting gas velocities through lift conduits as used in such operations are generally within the approximate range 25 to 100 feet per second as calculated by dividing the volume rate of the lifting gas by the cross-sectional area of the lift conduit.

The invention claimed is:

1. In apparatus for elevating granular solids by means of a lifting gas through a lift conduit into a disengaging vessel, the improvement which comprises: within said disengaging vessel a baffle substantially concentric with and above the top of said lift conduit and having a gradually downwardly tapered central portion concentric with said lift conduit and an outer portion the under surface of which is smoothly curved from said central portion through a raised intermediate annular section to a lower outer annular section, said baffle having an aperture therethrough concentric with said lift conduit and extending through said central portion, said aperture having cross sectional area at its lower end less than the cross sectional area of the outlet of said lift conduit; and a braking gas conduit communicating with an upper portion of said aperture and terminating exteriorly of said vessel.

2. Apparatus according to claim 1 wherein said vessel has a gas outlet adjacent and below the top of said lift conduit, and has a separate solids outlet.

3. Method for elevating granular solids which comprises: passing granular solids and lifting gas upwardly through a confined zone as a confined stream and therefrom into an expansion zone as a stream of gas having solids suspended therein; discharging braking gas downwardly into the center of and substantially concentrically with said stream, the volume rate of discharge of braking gas being less than the volume rate of discharge of lifting gas into said expansion zone, said braking gas having at discharge a cross sectional area less than that of said confined stream at the top of said confined zone; deflecting lifting gas and braking gas and solids radially outwardly away from said center by means of a deflecting surface, the angle of deflection from the vertical gradually increasing to 90°, then deflecting lifting gas and braking gas and solids downwardly away from said center as an annular stream by means of a deflecting surface, the angle of deflection from the horizontal gradually increasing; maintaining a cushioning layer of said braking gas between said solids and the deflecting surfaces; and separating solids from gas.

4. Method according to claim 3 wherein gas is withdrawn inwardly from said annular stream and removed from said expansion zone, and wherein solids are removed from said expansion zone substantially separately from lifting gas and braking gas.

5. Apparatus according to claim 1 wherein said baffle has inclined apertures therethrough adapted to discharge an annular stream of braking gas downwardly inclined away from the longitudinal axis of said baffle, the lower ends of said inclined apertures being at a higher level than the lower end of the first-named aperture, and wherein means are provided for supplying braking gas to an upper portion of said inclined apertures.

6. Method according to claim 3 wherein an inclined annular stream of braking gas is discharged downwardly into said stream in a direction away from the longitudinal axis of said stream, the level of such discharge being above the level of discharge of the first-named braking gas.

7. Method according to claim 3 wherein said solids are a cracking catalyst subject to substantial attrition, and said braking gas is inert to said catalyst.

8. Method according to claim 3 wherein the maximum height of rise of solids in said expansion zone is maintained at a level below the maximum height to which said solids would rise in the absence of said deflecting, the vertical distance of said level beneath the last-named maximum height of rise being not greater than three times the major dimension of the average cross section of the stream of gas rising through said confined zone.

References Cited in the file of this patent

UNITED STATES PATENTS

| | | |
|---|---|---|
| 1,498,630 | Jensen | June 24, 1924 |
| 2,054,441 | Peebles | Sept. 15, 1936 |
| 2,106,869 | Falkenstein | Feb. 1, 1938 |
| 2,358,497 | Egloff | Sept. 19, 1944 |
| 2,643,161 | Shirk | June 23, 1953 |